United States Patent
Rose et al.

(10) Patent No.: US 6,882,918 B2
(45) Date of Patent: Apr. 19, 2005

(54) ELECTRIC DRIVE MANAGEMENT SYSTEM AND METHOD

(75) Inventors: Charles Earl Rose, Metamora, IL (US); Ling Liu, Peoria Heights, IL (US)

(73) Assignee: Caterpillar Inc, Peoria, IL (US)

( * ) Notice: Subject to any disclaimer, the term of this patent is extended or adjusted under 35 U.S.C. 154(b) by 51 days.

(21) Appl. No.: 10/230,257

(22) Filed: Aug. 29, 2002

(65) Prior Publication Data

US 2003/0125860 A1 Jul. 3, 2003

Related U.S. Application Data

(60) Provisional application No. 60/342,377, filed on Dec. 27, 2001.

(51) Int. Cl.[7] .................................................. G06F 7/00
(52) U.S. Cl. .......................................... 701/54; 701/51
(58) Field of Search ................................ 701/50, 51–54; 477/43; 56/10.1, 10.2

(56) References Cited

U.S. PATENT DOCUMENTS

| | | | |
|---|---|---|---|
| 5,488,817 A | * | 2/1996 | Paquet et al. ............. 56/10.2 R |
| 5,682,315 A | | 10/1997 | Coutant et al. |
| 6,579,206 B1 | * | 6/2003 | Liu et al. ....................... 477/43 |

* cited by examiner

*Primary Examiner*—Yonel Beaulieu
(74) *Attorney, Agent, or Firm*—Finnegan, Henderson, Farabow, Garrett & Dunner

(57) ABSTRACT

A system is provided for controlling a work machine, including an electric continuously variable transmission. The system includes a microprocessor, wherein the microprocessor is configured to include a state machine for controlling the behavior of a work machine. The state machine includes a set of states representing possible conditions the work machine may encounter between starting at a zero energy input and being ready to work.

21 Claims, 3 Drawing Sheets

ELECTRIC DRIVE MANAGEMENT SYSTEM AND METHOD

CROSS REFERENCE TO RELATED APPLICATIONS

This application claims the benefit of U.S. Provisional Application No. 60/342,377, filed Dec. 27, 2001, the contents of which are hereby incorporated by reference.

TECHNICAL FIELD

The present invention relates generally to electric drive systems and, more particularly, to a system and method for controlling and managing the change of an electric drive system between two states in response to a single operator's request, where the first state is a work machine at rest with zero engine speed and the second state is a work machine with a functioning power source with all systems ready to respond to operator inputs.

BACKGROUND

Machines with electric drive systems, such as those including a continuously variable transmission (CVT) or more specifically, a split torque transmission, typically require that a machine be started from a zero engine speed state and prevent motion until an operator commands the machine to move. Before being able to accept operator commands, any electric drive system must complete a number of steps. For example, the status of the parking brake, any clutches, and/or any number of other systems may need to obtain a certain state before that step is completed and the new state is reached. Additionally, the steps may not occur in a truly linear fashion. For example, if after completing one step, a certain event occurs, the machine may revert to the previous step or may go to any other defined step. Although the subsequent step must be defined, it may not be a linear step. Further, fault conditions may be detected at any step, forcing the machine to go into a fault mode.

Prior art systems and methods exist for controlling a split torque transmission system. One such system and method is described in U.S. Pat. No. 5,682,315, entitled "Method and System for Controlling a Split Torque Transmission." This system includes a hydrostatic transmission and a mechanical transmission. The system also includes a microprocessor, including a number of modules for performing the number of steps required to go from a zero engine state to a state where the machine is awaiting operator commands. The system, however, is not directed to electric CVT systems, which may require additional criteria to be met before moving between steps. Further, the system provides a fairly linear approach to the steps leading from a zero engine state to a state where the machine awaits operator command.

Thus, the prior art does not provide an efficient means to control initial operation of a work machine utilizing an electric continuously variable transmission. The present invention is directed to overcoming one or more of the problems or disadvantages associated with the prior art.

SUMMARY OF THE INVENTION

A system is provided for controlling a work machine, including an electric CVT. The system includes a microprocessor, wherein the microprocessor is configured to include a state machine for controlling the behavior of a work machine. The state machine includes a set of states representing possible conditions the work machine may encounter between starting at a zero energy input and being ready to work.

In another aspect, a method is provided for controlling an electric continuously variable transmission (CVT) in a work machine. A state machine is provided. The current state of the work machine is determined. Status information about the work machine is also obtained. Based on the state machine and the status information, it is determined whether criteria to jump to a new state are met. If the criteria are met, instructions are provided to the work machine to effect the behavior required by the new state.

It is to be understood that both the foregoing general description and the following detailed description are exemplary and explanatory only and are not restrictive of the invention as claimed.

BRIEF DESCRIPTION OF THE DRAWINGS

The accompanying drawings, which are incorporated in and constitute a part of this specification, illustrate exemplary embodiments of the invention and together with the description, serve to explain the principles of the invention. In the drawings.

DETAILED DESCRIPTION

Reference will now be made in detail to embodiments of the invention, examples of which are illustrated in the accompanying drawings. Wherever possible, the same reference numbers will be used throughout the drawings to refer to the same or like parts.

Figure 1:
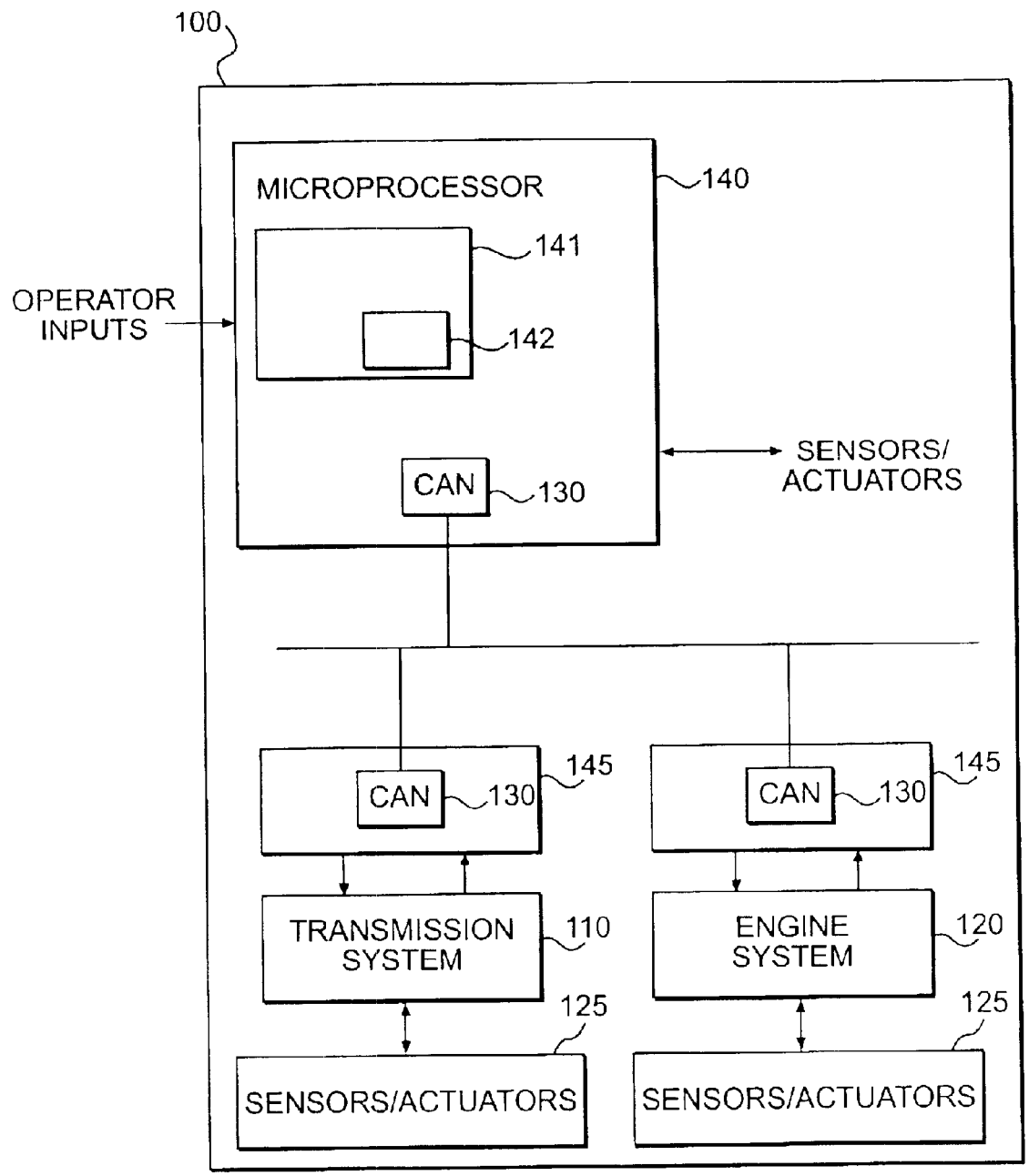
FIG. 1 is a block diagram illustrating a machine including an electric drive transmission management system, consistent with one exemplary embodiment of the present invention.

A system and method are provided for controlling the smooth and efficient operation of machine including an electric CVT. FIG. 1 illustrates a machine 100 including an electric drive transmission management system, consistent with one exemplary embodiment of the present invention. Machine 100 includes a transmission system 110, an engine system 120, one or more sensors/actuators 125 and a controller area network (CAN) data link 130. Machine 100 may also include other systems, such as an implement hydraulic system, fan hydraulic system, steering system, or any other system associated with machine 100. Machine 100 also includes microprocessor 140. Transmission system 110 includes any mechanism that transfers power from engine 120 to drive the machine. Transmission system 110 includes electric CVT systems, and specifically electric split torque transmission systems. Sensors/actuators 125 provide information and instructions to and from the transmission system 110 and/or the engine system 120 to microprocessor 140. Transmission system 110 and engine system 120 are each associated with a CAN data link 130 and a microprocessor 145. CAN data links 130 provide connections between industrial devices, such as sensors, not shown, such as sensors associated with transmission system 110 and/or engine system 120, and higher-level devices, such as microprocessor 140 or a specialized microprocessor, such as an electronic control module (ECM), not shown. Alternatively, CAN data links 130 may be implemented using any communication protocol.

Microprocessor 140 may include a storage device, including a memory 141 having set of instructions 142 for navigating through the states from zero engine power to the state where operator commands may be accepted. Set of instructions 142 may also be known as a state machine. Microprocessor 140 may be implemented in various environments to provide the tools for determining a current state of the machine 100, obtaining status information about machine 100, and determining when to change to a new state. Microprocessor 140 may include hardware specifically constructed for performing various processes and operations of the invention or may include a general purpose computer or computing platform selectively activated or reconfigured by program code to provide the necessary functionality. Microprocessor 140 is mounted in machine 100 and may receive inputs from the machine operator. Microprocessor 140 further includes input and output devices for receiving data from, or sending instructions to, the microprocessors 145 associated with transmission system 110 and engine system 120 based on state machine 142. The data and instructions are sent through CAN data links 130.

Figure 2:
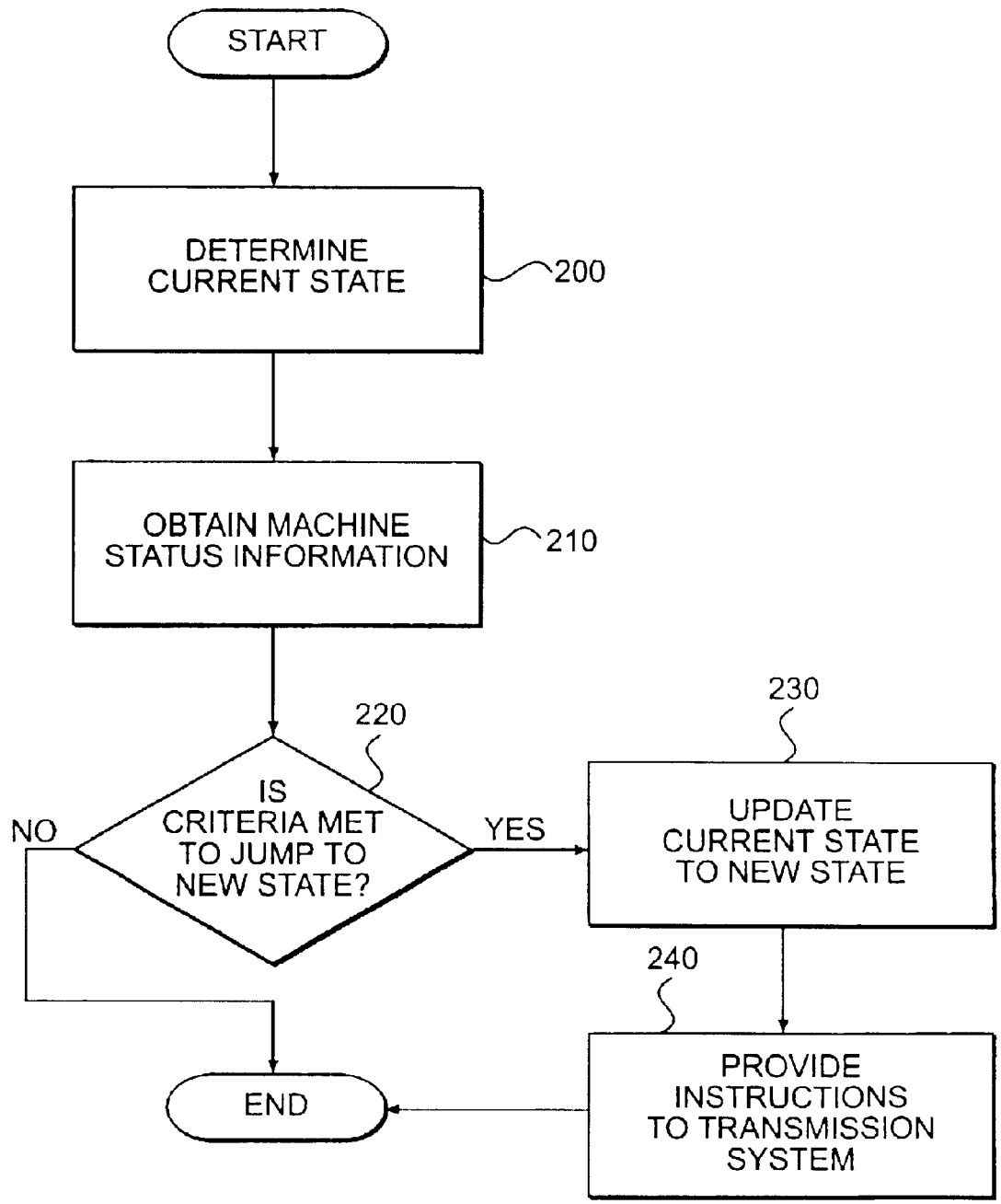
FIG. 2 is a flow chart of steps performed by an electric drive transmission management system, consistent with one exemplary embodiment of the present invention.

FIG. 2 illustrates a flow chart of a method for controlling an electric CVT system, consistent with one exemplary embodiment of the present invention. Microprocessor 140 begins from the default state of machine 100 (step 200). The states, and the state machine describing the states, are discussed in detail with respect to FIG. 3. Microprocessor 140 may include a memory configured to store information about the current state of the machine following each change within the state machine 142. Alternatively, microprocessor 140 may obtain status information from sensors associated with the transmission system 110 or engine system 120. Microprocessor 140 may then determine the probable state based on the status information, for example, by consulting a look-up table of states. In yet another embodiment, microprocessor 140 may determine the current state based on an external stimulus. For example, when a key is turned to start a machine, microprocessor 140 may determine that the current state is "power-up."

Microprocessor 140 then obtains machine status information (step 210). For example, using sensors connected to the transmission system 110 or engine system 120 or other machine component, the microprocessor 140 may obtain information such as the state of the clutch, the status of the motor, the control mode of the transmission, and/or whether the parking brake is engaged. Other relevant status information may also be obtained. Microprocessor 140 may poll all inputs or may only poll those inputs necessary to determine the next state.

Next, microprocessor 140 determines whether criteria have been met to change to a new state (step 220). This determination may be based on the current state of the machine, determined in step 200, and the status information about the machine, obtained in step 210, such as whether certain events have occurred in machine 100. If all of the criteria are met, microprocessor 140 may change to a new state and update a memory to store the new state as the current machine state (step 230). Further, microprocessor 140 may provide instructions to transmission system 110 to create the conditions associated with the new state (step 240). For example, microprocessor 140 may send instructions to the motor system to change the state of the motor from stand-by to running. If all criteria are not met, machine 100 stays in its current state. It should be understood that it may be possible to jump to more than one state from a current state, making the system non-linear. For example, if one set of criteria are met, the system may jump from the current state to the next state. However, if a different set of criteria are met, the system may jump from the current state to the previous state, or another predefined state. The implementation of this system using a state machine, stored in microprocessor 140, permits this type of flexibility in changing states.

Figure 3:
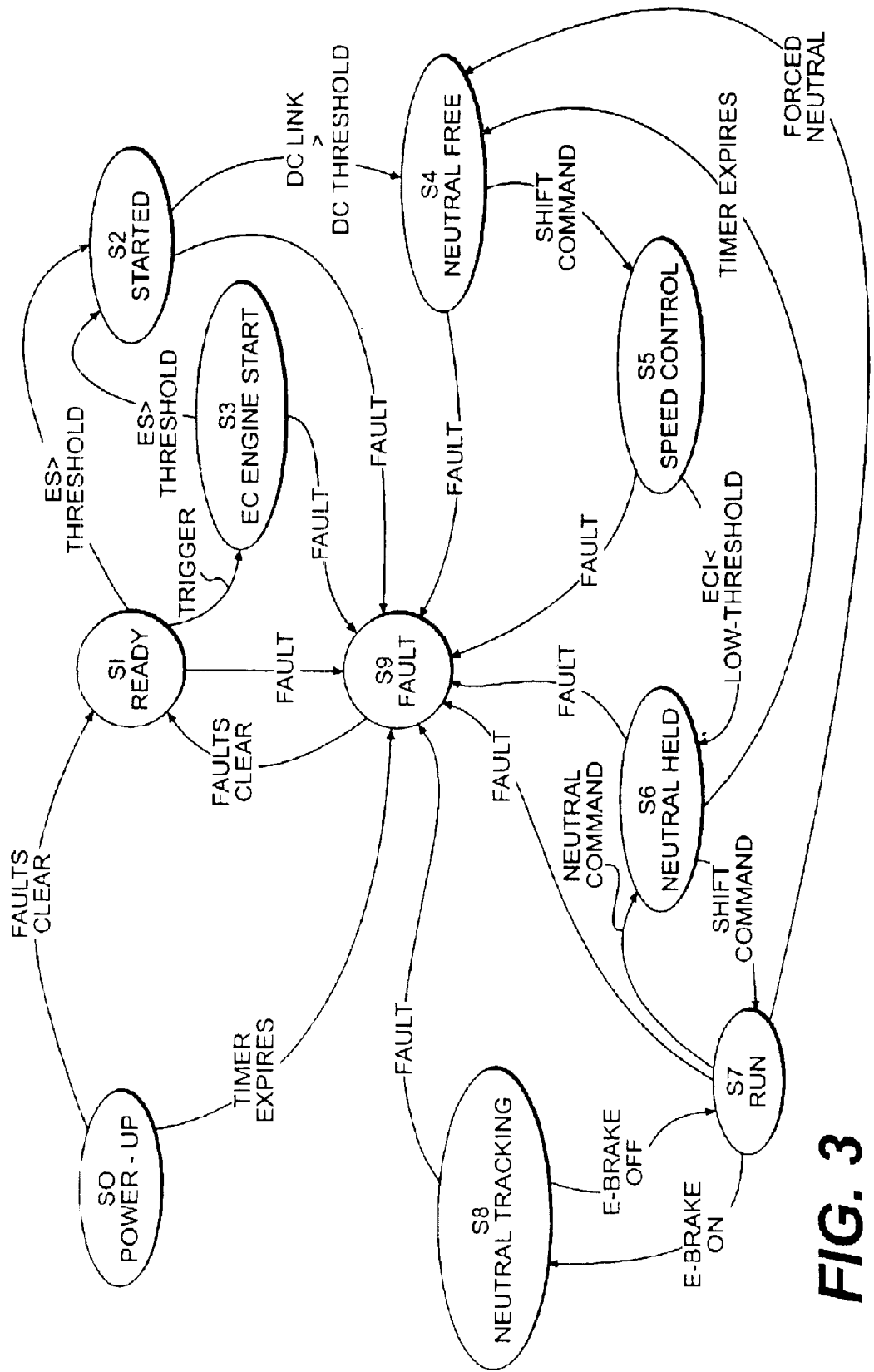
FIG. 3 is a state diagram illustrating an algorithm performed by an electric drive management system, consistent with one exemplary embodiment of the present invention.

FIG. 3 illustrates a state diagram, describing the state machine 142 stored in microprocessor 140, consistent with one exemplary embodiment of the present invention. Specifically, one exemplary embodiment of the state machine includes 10 states—S0, power-up; S1, ready; S2, started; S3, EC Engine Start; S4, Neutral Free; S5, Speed Control; S6, Neutral Held; S7, Run; S8, Neutral Tracking; and S9, Fault. As microprocessor 140 determines that a change between states is appropriate, microprocessor 140 modifies instructions to components, such as the transmission system 110, engine system 120, or other components, to effect the behavior associated with the new state. Each of these states, and the criteria required to jump to a new state from that state, will now be discussed.

S0, or power-up, is the default state, and is also the starting point when a machine is first turned-on. In this state, it is expected that the parking brake is engaged, the motor management state is in a fault reset mode, and the transmission control is in torque mode. The motor status is not ready and all clutches should be disengaged. Because this is the start-up state, the state machine may be more tolerant of faults. In each of the other states S1–S8, the state machine may jump to the fault state, S9, in the event of a fault. In power-up S0, however, the machine may instead reset the fault. The machine may not reset the faults indefinitely; but rather, may set a timer. The timer may either count the number of minutes, or other time unit, elapsed since entering S0, or may count the number of faults reset. In either case, once the timer expires, the machine will jump from S0 to fault S9. Startup faults may include situations such as failure to establish communications with the CAN data link. If there are no faults, or if the faults are cleared before the expiration of the timer, the machine will jump from S0 to ready S1.

S1, or the ready state, is the state where communications between systems are established and the machine is waiting for the engine to start. In this state, it is expected that the parking brake is engaged, no motor management is enabled, and the transmission is in torque mode. The motor status is ready or stand-by and all clutch remain disengaged. From S1, the machine may jump to fault S9 if a fault is detected. Faults for this state (as well as for states S2–S8) include such events as loss of oil pressure, over heating, or loss of steering system control. Other faults may be included, such as if microprocessor 140 loses communication with CAN 130 for a certain period of time. Fault criteria may be stored in microprocessor 140 as criteria events. S1 is also the default state for returning after a fault has been cleared. For example, if from any state, microprocessor 140 detects a fault event, the machine may jump to fault S9. This may involve, for example, detecting the loss of oil pressure. From fault S9, once the machine determines that the fault event has been cleared, or in this case, that the oil pressure has reached an acceptable level, the machine will jump back to ready state S1. In normal operation, the machine will jump from S1 to started state S2 once the engine speed exceeds a threshold value. For example, the machine may require the engine speed to be greater than 400 rpm before jumping to S2. In one embodiment, a special exception may be made for fault recovery. In this embodiment, if the machine is returning to ready state S1 from fault S9, the machine may after one loop (or one pass through the method detailed in FIG.

2) jump to started state S2. This embodiment permits efficient fault recovery by moving the process forward when a fault occurs at a later step. Alternatively, the machine may jump from S1 to EC engine start S3 if a trigger is engaged. A trigger may be a key, button, switch, or other manual device, activated by the operator to force a jump from S1 to S3.

S2, or the started state, occurs when the engine is running and the system is bringing up the DC link. The goal of this state is to get the electric motor system into a functional state to prepare to operate as a work tool, until a shift is requested. This state may be equivalent to developing flux in an induction motor prior to operation. In this state, it is expected that the parking brake is engaged, the motor management is starting the DC link, and the transmission control is in split torque mode. The motor remains in ready or stand-by status and the clutch remains in neutral. The machine remains in this state until the DC link exceeds a DC voltage threshold value, at which point, the system jumps to S4. For example, the machine may remain in S2 until the DC link is greater than 500 volts.

S3, or the EC engine start state, is an alternative state between S1 and S2. As discussed, the machine may jump from S1 to S3 upon the event of a trigger. The EC engine start state S3 permits electrical component 1 (EC1) and/or electrical component 2 (EC2), supplied by either wall power or an up-converted battery, to start the engine, rather than using a conventional starter. Electrical components EC1 and EC2 may include electric motors that operate as either motors or generators and may be part of the transmission system. The values to set EC1 and/or EC2 may be inputted manually at a terminal window or other input device or may be hard-coded into the microprocessor. Alternatively, these values may be set through other methods, such as via wireless or infrared technology, or may be determined based on factors associated with the machine. The expected status of this state is similar to that of started state S2, except that the motor may be in speed or torque mode. Similar to the jump between S1 and S2, the machine will jump from S3 to S2 when a threshold engine speed is exceeded.

S4, or the neutral free state, occurs when the engine is running, the electrical components are ready, and the DC Link is up. This state is the default running state and the state of lowest running energy. At this state, the machine is not ready to go into gear and the motor speed is uncontrolled. The expected status includes an engaged parking brake, the motor management is running, and the transmission is in torque mode. The motor is running and the clutches are disengaged. The machine awaits a command to shift before jumping from S4 to S5.

S5, or the speed control state, brings the speed of EC1 (or EC2) to zero speed. In this state, the speed of EC1 is measured, and then uses closed loop control. Closed loop control may include an electrical component speed measurement and a desired speed. An error is described as the difference between these two signals, and may be magnified using typical methods such as multiplication by a gain, integration over time and/or a derivative of the error. The final signal used to generate a control signal to the component resembles a torque, applied by the control system to bring the component to zero speed. After the speed of EC1 reaches a low threshold limit, the machine will jump from S5 to neutral held state S6. If the system uses a single speed control integrator for performing this step, as well as when the machine is in a fully functional situation, the speed control integrator may need to be reset after this step to avoid affecting the machine while running. In this state, it is expected that the parking brake is engaged, the motor management is running, and the transmission system is controlling the speed of EC1. The motor is running and the clutch is in neutral. In an alternative embodiment, this state may not be necessary, and the state machine may change from S4 to S6.

S6, or the neutral held state, holds EC1 at zero speed while awaiting a shift command. Once a shift command is received, the machine jumps to run state S7. As with S5, if a single speed control integrator is used, it may need to be cleared or limited after this step. The expected status of this state is similar to S5, except that the transmission control returns to split torque mode and the parking brake is disengaged. Further, one aspect of this state is that a timer begins counting upon entering S6. If a shift command is received prior to the expiration of the timer, the machine jumps to run state S7. If the timer expires before a shift command is received, however, the machine jumps to neutral free state S4. This state may be simply a pass-through point if a valid shift command has been received prior to entering this state and the speed of EC1 is zero.

S7, or the run state, is the state in which the operator takes over the system and the machine accepts motion commands from the operator. In this state, it is expected that the parking brake is disengaged, the motor management is running, and the transmission system is operating in split torque control mode. The engine is running and the clutch state is determined by the operator or a control system. If a neutral command is received, the machine jumps from S7 back to neutral held state S6. If a forced neutral command is received, the machine jumps from S7 back to neutral free state S4. If the system encounters an emergency stop situation and the service brake is on, the machine jumps from S7 to neutral tracking S8, where it remains until the service brake is off. The conditions of the work machine in this state may be similar to that of neutral held state S6, or may be defined by the operator.

S9, or the fault state, is where the machine jumps to from states S1–S8 if a fault is detected. Also, power-up S0 will jump to S9 if a timer expires before all faults are cleared. As discussed, the default return state from S9 is ready state S1, where the exact status of the full system is checked after a fault. At this point, it is expected that the motor management is in low-voltage mode and the transmission control is in split torque mode. The motor status and the status of the parking brake may be dependent on the state prior to jumping to the fault state S9. This state may be a "clutch faulted" state. The clutch is in a forced neutral position or all disengaged. In one embodiment, faults may need to be cleared manually before jumping from S9 to S1. Alternatively, microprocessor 140 may be able to determine a change in machine information indicating the clearing of a fault.

Although the state diagram discusses a split torque mode transmission and a system including EC1 and EC2, it should be understood that any electrical CVT system may be configured using a similar state diagram. Further, it should be understood that fewer or additional states may be possible, depending on the goal for the machine's operation.

Industrial Applicability

By using a state diagram and method to control the machine initialization process starting from no energy input at the machine level to producing a system that is ready to work, an efficient process can be implemented. Further, the system requires little or no input from the operator to transit between the states. Essentially, the operator turns a key to enter the power-up state, puts the machine in gear, and the machine will then become ready to go. The state machine approach permits non-linear transitions between states. Thus, the present invention has potentially wide application to various work machines utilizing an electric continuously variable transmission.

It will be readily apparent to those skilled in this art that various changes and modifications of an obvious nature may be made, and all such changes and modifications are considered to fall within the scope of the appended claims. Other embodiments of the invention will be apparent to those skilled in the art from consideration of the specification and practice of the invention disclosed herein. It is intended that the specification and examples be considered as exemplary only, with a true scope and spirit of the invention being indicated by the following claims and their equivalents.

What is claimed is:

1. A system for controlling a work machine, including an electric continuously variable transmission (CVT), the system comprising:
   a microprocessor,
   wherein the microprocessor is configured to include a state machine for controlling the behavior of the work machine,
   wherein the state machine includes a set of states representing possible conditions the work machine may encounter between starting at a zero energy input and being ready to accept operator inputs, and
   wherein the microprocessor is configured to provide instructions to the work machine to effect a change from a current state of the work machine to another state in the set of states when the microprocessor determines that criteria have been met.

2. The system of claim 1, further including:
   a communications protocol;
   an engine system;
   a transmission system; and
   one or more sensors for obtaining information from at least one of the engine system or the transmission system,
   wherein the communications protocol facilitates communication between the engine system, the transmission system, the sensors, and the microprocessor.

3. The system of claim 2, wherein information for navigating the state machine is based on information received from at least one of the engine system or the transmission system.

4. The system of claim 1, wherein the state machine includes:
   a power-up state;
   a ready state, where the state machine goes from the power-up state if no faults exist;
   a started state, where the state machine goes from the ready state once an engine speed exceeds a threshold value;
   a neutral free state, where the state machine goes from the started state, once a DC link exceeds a DC threshold value;
   a neutral held state, where the state machine goes from the speed control state when an electrical component is below a low threshold;
   a run state, where the state machine goes from the neutral held state if a valid shift command is received;
   a neutral tracking state, where the state machine goes from the run state if an emergency brake is engaged; and
   a fault state, where the state machine goes from any other state in event of a fault.

5. The system of claim 4, wherein the state machine further includes:
   a speed control state, where the state machine goes from the neutral free state upon receiving a shift command.

6. The system of claim 4, wherein a fault event occurs if at least one of the following situations is detected: low oil pressure, over heating of the work machine, loss of steering control, motor overvolt, over heating of winding, over current, or lack of communication between work machine components.

7. The system of claim 4, wherein the state machine further includes an EC engine start state where the state machine goes upon receiving a trigger while in the ready state.

8. The system of claim 7, wherein the state machine goes from the EC engine start state to the started state when the engine speed exceeds the threshold value.

9. A method for controlling initialization of a work machine having an electric continuously variable transmission (CVT), comprising:
   providing a state machine;
   determining a current state of the work machine;
   obtaining status information about the work machine;
   determining if criteria to jump to a new state are met, based on the state machine and the status information; and
   providing instructions to the work machine to effect behavior of the work machine required by the new state if the criteria are met.

10. The method of claim 9, further including updating the current state of the work machine to equal the new state if the criteria are met.

11. The method of claim 9, wherein the step of determining a current state of the work machine includes determining a current state of the work machine based on status information about the work machine.

12. The method of claim 9, wherein the step of determining a current state of the work machine includes determining a current state of the work machine based on external stimulus.

13. The method of claim 9, wherein the step of determining if criteria to jump to a new state are met includes:
   determining if the current state of the work machine is a power-up state; and
   determining if fault reset criteria are met if the current state of the work machine is a power-up stare;
   wherein the criteria to jump to a new state are determined to be met if the reset criteria are met and wherein a fault is reset and the criteria to jump to a new state are determined not to be met if the fault reset criteria are not met.

14. The method of claim 13, wherein the fault reset criteria includes an elapse of a predetermined time period.

15. The method of claim 13, wherein the fault reset criteria includes counting a threshold number of fault resets.

16. The method of claim 9, wherein the step of determining if criteria to jump to a new state are met includes:
   determining if the current state of the work machine is a fault state;
   determining if the criteria to jump to a new state are met if a fault reset event has occurred.

17. The method of claim 16, wherein the fault reset event includes a manual clearing of the fault.

18. The method of claim 16, wherein the fault reset event includes determining a change in the status of the work machine indicating clearing of the fault.

19. The system of claim 1, wherein the microprocessor obtains status information about the work machine and determines whether the criteria are met based on the state machine and the obtained status information.

20. A system for controlling a work machine, including an electric continuously variable transmission (CVT), the system comprising:

a microprocessor; and a state machine, associated with the microprocessor, for controlling the behavior of the work machine, wherein the state machine includes a set of states representing possible conditions the work machine may encounter during an initialization process starting from a zero energy input to being ready to accept operator inputs and perform work.

21. The system of claim 20, wherein the microprocessor provides instructions to the work machine to effect a change from a current state of the work machine to a first state in the set of states when the microprocessor determines that first criteria have been met, and provides instructions to the work machine to effect a change from the current state to a second state in the set of states when the microprocessor determines that second criteria have been met.

* * * * *